United States Patent [19]

Bartholomew

[11] Patent Number: 4,737,890
[45] Date of Patent: Apr. 12, 1988

[54] PHOTOGRAPHIC LIGHT REFLECTOR

[76] Inventor: Gary A. Bartholomew, 433 E. Golf Rd., Des Plaines, Ill. 60016

[21] Appl. No.: 10,470

[22] Filed: Feb. 3, 1987

[51] Int. Cl.⁴ .............................................. G03B 5/02
[52] U.S. Cl. ...................................... 362/18; 362/319; 362/346; 362/352; 362/360
[58] Field of Search ..................... 362/16, 17, 18, 317, 362/319, 346, 352, 360

[56] References Cited

U.S. PATENT DOCUMENTS 4,428,030  1/1984  Baliozian ..................... 362/352 X
4,460,946  7/1984  Tinz ............................. 362/319

FOREIGN PATENT DOCUMENTS 3443840  6/1986  Fed. Rep. of Germany ........ 362/17

Primary Examiner—Stephen F. Husar
Attorney, Agent, or Firm—Edmond T. Patnaude

[57] ABSTRACT

A cardboard sheet whose faces have different light reflective characteristics is foldable into a self-standing configuration and includes an infinitely adjustable connection between overlapping parts of the sheet for adjusting the angular position of a light reflective portion of the sheet. In the preferred embodiment the infinitely adjustable connection consists of a permanent magnet mounted to one end section of the sheet and a ferromagnetic strip mounted to the opposite end section of the sheet, the magnet and the strip being in operative engagement when the two end sections are in mutually overlapping relationship.

16 Claims, 2 Drawing Sheets

U.S. Patent   Apr. 12, 1988   Sheet 1 of 2   4,737,890
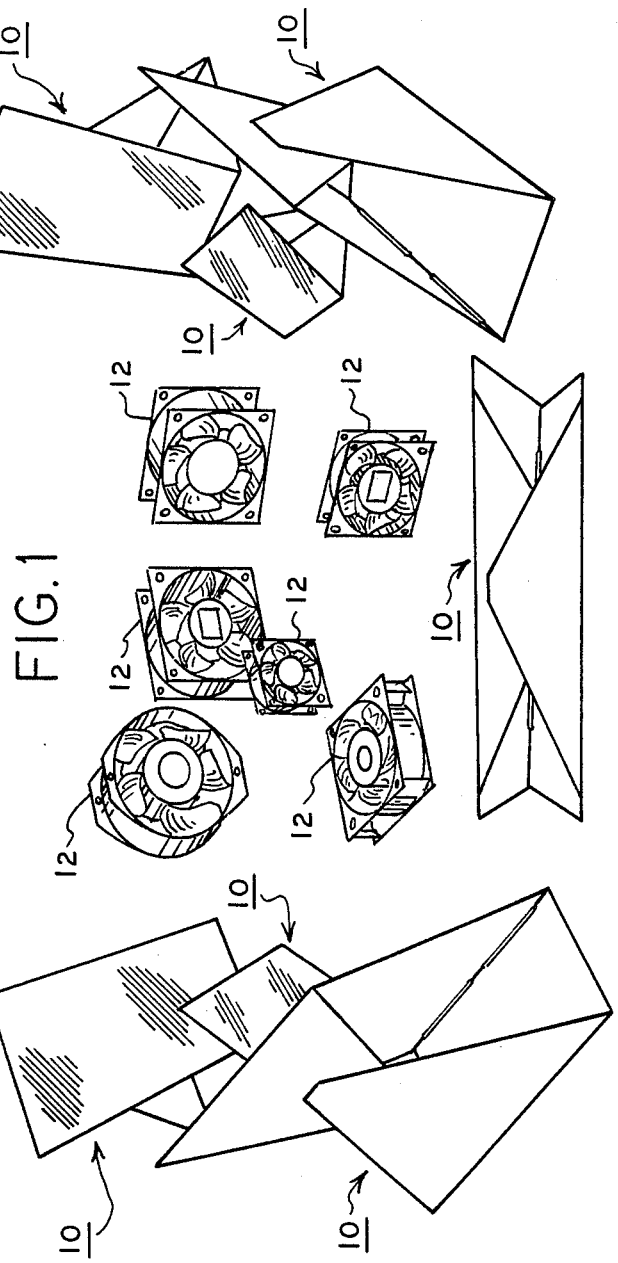
FIG. 1
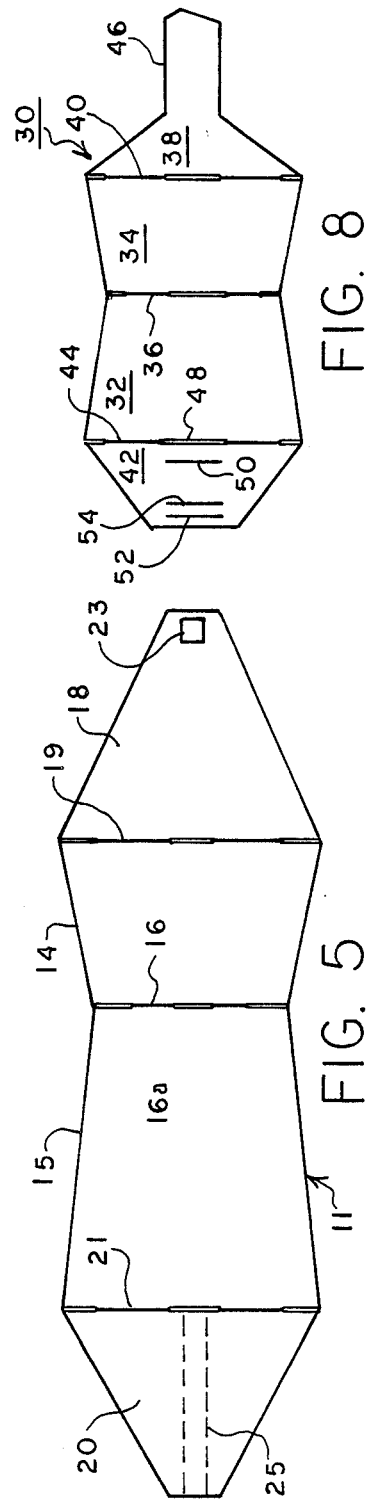
FIG. 8
FIG. 5

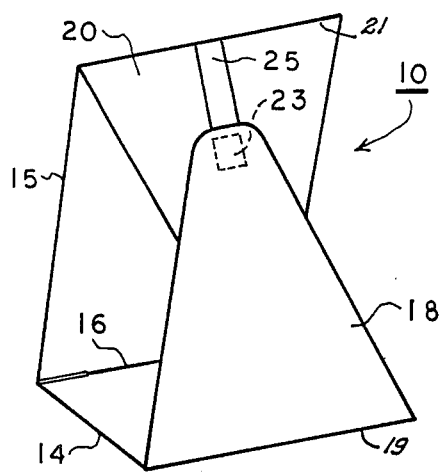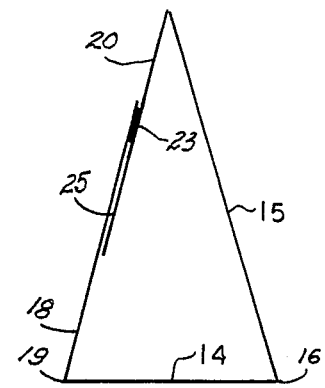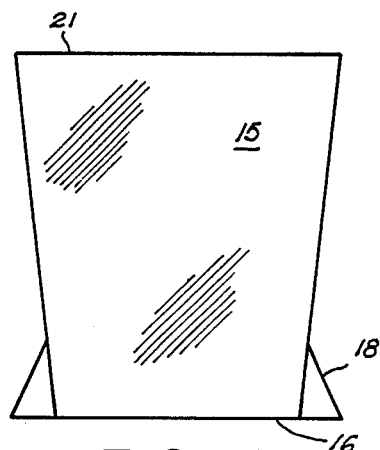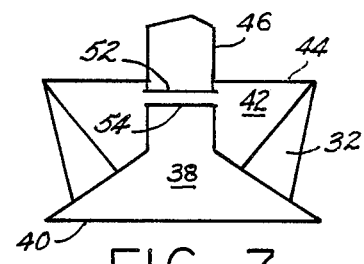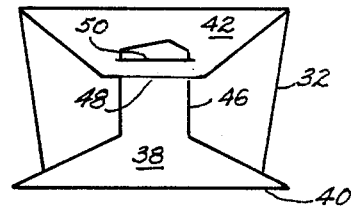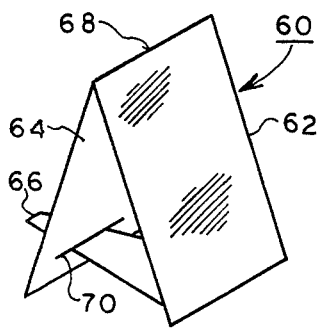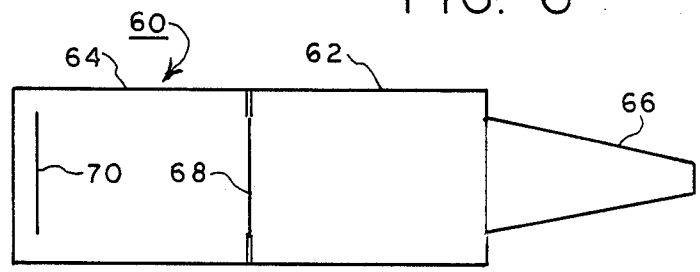

PHOTOGRAPHIC LIGHT REFLECTOR

The present invention relates in general to self-standing light reflectors for controlling the light directed onto a subject to be photographed, and it relates more particularly to a new and improved, relatively inexpensive light reflector formed of cardboard or the like and having a light reflective section whose angular position is easily and infinitely adjustable throughout a substantial range.

BACKGROUND OF THE INVENTION

When taking photographs, particularly at the professional level, it is the usual practice to employ a plurality of light reflective surfaces to accurately control the location at which light is directed onto different parts of the subject. Such light reflective surfaces have been provided on sheets or cards mounted on easels, stands and in some cases simply rested on or against other available objects such as small boxes or the like. In order to see how effective such reflectors are, i.e., will they appear in the picture and is the light being properly directed at the subject from each reflector, it is necessary for the photographer to observe the subject from a location in proximity to the lens of the camera and then to make any necessary changes in the positions of the reflectors. When using the prior art reflectors this positioning and repositioning of the reflectors is often a time consuming procedure.

SUMMARY OF THE INVENTION

Briefly, there is provided in accordance with the present invention a new and improved light reflector which is light in weight, inexpensive, self-standing and which includes a light reflective planar surface, the angular position of which is easily adjusted relative to the horizontal.

In one embodiment of the invention a permanent magnet and an elongate ferro-magnetic strip are mounted on respective end sections of a cardboard sheet having two intermediate light reflector sections connected to the end sections by parallel fold lines. When the sheet is folded to position the end sections in overlapping relationship the magnet and the adjacent portions of the strip are magnetically attracted to hold the sheet in the set configuration. The end sections may be slidably moved relative to one another in infinitely small increments to enable the precise adjustment of the angle of the light reflector sections relative to one another. In use one or the other of the reflector sections functions as the base wherefore adjustment of the angle between these sections adjusts the angle at which light is reflected from the reflector.

In another embodiment of the invention the end sections are held in infinitely adjustable overlapping positions by means of a tongue extending from the distal end of one end section and a pair of parallel slots provided in the other end section and through which the tongue is adapted to extend. Friction between the tongue and the edges of the slots holds the end sections in the adjusted position.

In accordance with another important feature of the invention, the light reflecting sections of the reflectors are trapezoidal to permit positioning of the reflectors in closer proximity to the subject than is possible if the reflective sections are rectangular. Inasmuch as the reflectors are formed of cardboard or the like, the photographer can trim off the edges of the light reflective sections to maximize the desired lighting effect while still keeping the reflector out of the picture.

Further objects and advantages and a better understanding of the present invention will be had by reference to the following detailed description taken in connection with the accompanying drawings wherein:

FIG. 1 is a perspective view of a photographic subject showing the use of a plurality of reflectors embodying the present invention;

FIG. 2 is a perspective view, taken from the rear, of a light reflector embodying the present invention;

FIG. 3 is a side elevational view of the reflector shown in FIG. 2;

FIG. 4 is a front elevational view of the reflector shown in FIG. 2;

FIG. 5 is a plan view of the blank from which the reflector shown in FIG. 2 is formed;

FIG. 6 is a perspective view, taken from the rear, of another light reflector embodying the present invention showing the reflective surface in a relatively steep angular position;

FIG. 7 is a perspective view, taken from the rear, of the light reflector of FIG. 6 but showing the reflective surface at a substantially lesser angle relative to the horizontal;

FIG. 8 is a plan view of the blank from which the reflector of FIGS. 6 and 7 is formed;

FIG. 9 is a perspective view of still another light reflector embodying the present invention; and FIG. 10 is a plan view of the blank from which the reflector of FIG. 9 is formed.

DETAILED DESCRIPTION OF THE PREFERRED EMBODIMENT

FIG. 1 shows a photographic subject as viewed from the camera and which is lighted from an overhead light and a plurality of photographic reflectors 10 each embodying the present invention. The subject to be photographed is a plurality of blowers 12, and the reflectors 10 are arranged to highlight different portions of the blowers. FIG. 2 shows the rear side of a reflector 10 which is formed from a single sheet 11 of material such as cardboard and includes a base section 14 and a light reflector section 15 wherein the light reflecting surface is on the rear side of section 15 as viewed in FIG. 2. As may be seen in FIG. 5, the sections 14 and 15 are intermediate sections of the overall blank connected together by a fold line 16. The section 14 is trapezoidal and is connected to a trapezoidal end section 18 by a fold line 19 which extends parallel to the fold line 16. A second end section 20, which is also trapezoidal in shape, is connected to the intermediate section 15 by a fold line 21 which is parallel to the fold lines 16 and 19. To facilitate folding of the blank along the lines 16, 19 and 21, each of these fold lines is slotted as shown, for example at 16a in FIG. 5. These slots are not necessary.

Mounted near the distal end of the end section 18 is a thin permanent magnet 23. A thin ferromagnetic strip 25 is mounted to the end section 20 and may be seen to extend in a direction perpendicular to the fold lines 16, 19 and 21 along the central longitudinal axis of the blank. As shown, the magnet 23 and the strip 25 are disposed on opposite sides of the sheet 11. The reflector may be shipped in the flat state as shown in FIG. 5 or may, for example, be folded along the line 16 so that the sections 14 and 18 rest directly on the sections 15 and 20.

When the reflector 10 is to be used, the four sections are folded along the fold lines 16, 19 and 21 into the approximate configuration shown in FIG. 2 wherein the end sections 18 and 19 overlap and are substantially parallel to one another with the permanent magnet 23 engaging the magnetic strip 25. By simply sliding the magnet 23 along the strip 25, the angle at which the light reflector section 15 meets the base section 14 can be adjusted whereby the angle of the light reflective surface 15 relative to the horizontal is readily adjustable.

Preferably, both surfaces of the entire sheet 11, as shown in FIG. 5, are light reflective with one surface having a different light reflective characteristic than the other. For example, one side may be silver and the other side may be gold. Consequently, both intermediate sections 14 and 15 can be used as light reflective surfaces. Moreover, either face of the sheet 11 may be on the outside of the reflector as it is assembled as shown in FIGS. 2, 3, and 4. The only difference being that instead of the strip 25 being on the outside surface of the section 20 and the magnet 23 being on the inside surface of the end section 18 as shown in FIG. 2, the magnet 23 will be on the outside surface of the section 18 and the ferromagnetic strip 25 will be on the inside surface of the section 20.

Preferably, the intermediate sections 14 and 15 are of different sizes so as to increase the versatility of use of the reflector, i.e., it can be used where a relatively short reflector surface such as the surface 14 is necessary, wherefore the reflector would be positioned with the section 15 as the base, or where a taller reflective surface is required, then the shorter intermediate section 14 can be used as a base as illustrated in FIG. 3.

It will thus be seen by those skilled in the art that the photographer can readily reposition the reflectors 10 with one hand and also adjust the angle of the reflector surface relative to the horizontal with the same hand. Moreover, the angular position of the reflective surface is infinitely adjustable inasmuch as whatever position the magnet 23 is slid to along the strip 25 will be retained by the magnetic attraction between the magnet and the strip.

Referring to FIGS. 6, 7 and 8, there is shown another embodiment of the invention wherein the magnetic adjusting means is replaced by a friction connection between the end sections of the reflector. As is best shown in FIG. 8, a photo-reflector 30 includes first and second intermediate trapezoidal sections 32 and 34 which are connected together by a fold line 36. A first trapezoidal end section 38 is connected to the intermediate section 34 by a fold line 40, and the opposite trapezoidal end section 42 is connected to the intermediate section 32 by a fold line 44. The fold lines 36, 40 and 44 lie parallel to one another and perpendicular to the principal longitudinal axis of the sheet shown in FIG. 8.

Extending along the principal longitudinal axis of the sheet from the distal end of the section 38 is an elongate tongue 46 which is adapted to extend through a pair of parallel slots 48 and 50 when the reflector is folded into the position shown in FIG. 6. It will be seen that the slot 48 extends along the fold line 44.

A second pair of slots 52 and 54 are provided in the end section 52 in spaced relationship with the slots 40 and 50 and these slots are also adapted to receive the tongue 46 when the reflector is folded into the configuration shown in FIG. 7. It may be seen, therefore, that when a relatively steep reflective surface is required, the slots 52 and 54 are used to receive the tongue 46. When, on the other hand, a less steep reflective surface is desired, the tongue is positioned in the pair of slots 48 and 50.

It will be seen that the slots 48, 50, 52, and 54 have a length which is slightly greater than the width of the tongue 46 and the tongue is retained in whatever position it is adjusted to by virtue of the frictional engagement of the edges of the slots and the portion of the sheet intermediate the slots. Other than the adjustment holding means the reflector 30 is like the reflector 10.

It will be noted that the intermediate sections 14 and 15 of the reflector 10 and 32 and 34 of the reflector 30 are trapezoidal in shape so that when the reflector is in use the lower edge of the light reflective surface is shorter than the upper edge as shown, for example, in FIGS. 4 and 7. This trapezoidal shape permits placement of the reflector in closer proximity to the subject to be photographed without appearing in the picture than is possible if a rectangular light reflecting surface were used.

Referring to FIGS. 9 and 10 there is shown a light reflector 60 in position for use and the blank from which the reflector may be formed. In this embodiment of the invention, the reflector 60 constitutes a planar light reflector section 62 and another section 64. As in the other embodiments of the invention, both sides of the blank are preferably provided with a light reflective surface and preferably the light reflective characteristics of these two surfaces are different. In this embodiment of the invention, a tongue 66 extends from the distal end of the light reflector section 62 along the principal longitudinal axis of the blank in perpendicular relation to the fold line 68 which separates the section 62 and 64 from one another. A slit 70 is cut in the base section 64 near the distal edge thereof and as shown in FIG. 9 is adapted to receive the tongue 66 when the reflector is to be used.

In accordance with another aspect of the present invention, the sheets or blanks are formed of cardboard or the like so that the side edges of the reflective sections of the reflectors of the present invention can be trimmed by the photographer so as to be in a sense customized for the particular subject being photographed to prevent the reflector from showing in the picture when it is closely positioned relative to the subject. Inasmuch as the reflectors can be made of cardboard and are thus relatively inexpensive to manufacture and ship, even if they are trimmed and used for only one series of pictures, the cost is not prohibitive as would be the case with a more expensive reflector, stand and the like.

While the present invention has been described in connection with particular embodiments thereof, it will be understood by those skilled in the art that many changes may be made without departing from the true spirit and scope of the present invention. Therefore, it is intended by the appended claims to cover all such changes and modifications which come within the true spirit and scope of this invention.

What is claimed:

1. An adjustable light reflector, comprising in combination
   a planar member having a planar, intermediate section and first and second planar end sections respectively separated from said intermediate section by first and second parallel fold lines, at least one face of said intermediate section being light reflective, and first and second mutually cooperating means on said first and second end sections for holding said end sections in infinitely adjustable relationship in a direction perpendicular to said fold lines when said end sections are folded along said fold lines into mutually engaging relationship.

2. An adjustable light reflector according to claim 1 wherein said first cooperating means comprises a permanent magnetic member, said second cooperating means comprises a ferromagnetic member, and at least one of said first and second members is elongate in said direction perpendicular to said fold line.

3. An adjustable light reflector according to claim 2 wherein said intermediate section comprises two sections separated by a third fold line parallel to said first and second fold lines.

4. An adjustable light reflector according to claim 1 wherein said first cooperating means comprises a tongue extending from the distal end of said first end section in said direction perpendicular to said fold lines, and said second cooperating means comprises a slot in said second end section for frictionally receiving said tongue.

5. An adjustable light reflector according to claim 1 wherein said intermediate section comprises two sections separated by a third fold line parallel to said first and second fold lines.

6. An adjustable light reflector according to claim 5 wherein said first cooperating means comprises a tongue extending from the distal end of said first end section in said direction perpendicular to said fold lines, and said second cooperating means comprises first and second pairs of slots in said second end sections, said pairs of slots extending parallel to said first fold line.

7. An adjustable light reflector according to claim 6 wherein one of said slots in said first pair of slots is disposed along said second fold line.

8. An adjustable light reflector according to claim 1 wherein said planar member has first and second faces of different light reflective characteristics.

9. An adjustable light reflector according to claim 5 wherein said third fold line is shorter than at least one of said first and second fold lines.

10. An adjustable light reflector according to claim 5 wherein said first and second fold lines are longer than said third fold line.

11. An adjustable light reflector according to claim 5 wherein said first cooperating means comprises a permanent magnet affixed to one face of said first end section and said second cooperating means comprises a ferromagnetic strip affixed to one face of said second end section.

12. An adjustable light reflector according to claim 5 wherein said sections of said intermediate section are trapezoidal.

13. An adjustable light reflector according to claim 12 wherein said end sections are trapezoidal.

14. A method of making a light reflector from a sheet of light reflective material, comprising the steps of folding said sheet along a plurality of parallel fold lines so that the resulting configuration is triangular in cross-section and includes a first section and a second light reflector section, securing said sheet in said configuration, and trimming off at least one edge of said light reflector section of said sheet to provide said light reflector section with a trapezoidal shape.

15. A blank for a light reflector, said blank having at least one photoreflective face, comprising first and second trapezoidal intermediate sections connected together by a first fold line, first and second substantially trapezoidal end sections, second and third fold lines parallel to said first fold line and respectively connecting said first and second trapezoidal end sections to said first and second end sections.

16. A blank according to claim 15 comprising an elongate tongue extending from the distal end of said first end section, and at least one slot in said second end section extending parallel to said fold lines and having a length greater than the width of said tongue.

* * * * *